April 19, 1938.   W. C. LAUGHLIN   2,114,601
METHOD FOR TREATING SEWAGE
Filed Feb. 17, 1933

INVENTOR-
William C. Laughlin
BY C. P. Goepel
his ATTORNEY-

Patented Apr. 19, 1938

2,114,601

UNITED STATES PATENT OFFICE 2,114,601

METHOD FOR TREATING SEWAGE

William C. Laughlin, Kew Gardens, N. Y., assignor, by mesne assignments, to Filtration Equipment Corporation, New York, N. Y., a corporation of Delaware Application February 17, 1933, Serial No. 657,242

4 Claims. (Cl. 210—8)

My present invention relates to the art of sewage treatment, and has for its object the provision of an improved method for meeting the oxygen demand of the sewage and sludge, for promoting bacterial action in and biological flocculation of the suspended and colloidal substances contained in the sewage, and for aiding and hastening sedimentation and clarification.

It is well known that sewage and sludge have a large bio-chemical oxygen demand, which, unless kept constantly satisfied, results in putrefactive products; and that in order to meet the oxygen demand and avoid putrefaction, there must be an actual rate of solution of oxygen from the air or other source to the sewage liquid and sludge. In flowing streams the oxygen demand is met because practically every part of the water is successively exposed to the air or films of air so that there is in effect an actual rate of re-aeration of the body of the stream. It is one of the objects and purposes of my invention to emulate, condense and intensify the general aeration processes which take place in a flowing stream, at the same time to greatly increase the bacterial action or oxidation incident to aeration so as to augment and hasten the rate of digestion flocculation, coagulation, sedimentation and clarification.

The bacterial cultures or microscopic organisms, having aerobic characteristics, take their food from colloidal and dissolved substances in the sewage. They have great powers of absorbing oxygen and must have an abundance of oxygen whereby to continue functioning if desirable activation and biological flocculation of the suspended and colloidal substances are to be obtained on an aggrandizing basis. Activated sludge particles are composed very largely of enlivened, growing bacteria and one of the purposes and objects of my invention is to constantly and thoroughly diffuse through the sewage in the sedimentation chamber, oxygen and activated sludge particles in copious quantities so that these will contact the suspended and colloidal substances contained in the sewage in order to bring about absorption and flocculation. Through such diffusion and contact the bacterial cultures in great masses will be dispersed to the colloidal particles and flocculi to gather and grow therein in immense numbers.

It is within the province of my improved method to sprinkle, break up and aerate activated sludge under conditions in which the bacterial cultures are given a growth period while exposed to currents of air. To this end and in accordance with the principles of my invention, in order constantly to supply the sewage liquid with the oxygen and biologically active sludge requisite to bring about absorption, flocculation and coagulation of the colloidal and suspended substances, activated sludge is passed in a film-flow action and in contact with the atmosphere, through a culture-growth bed in which bacterial cultures are nourished and grown in immense numbers; and in this bed the filming action of the activated sludge is continuously broken up into thin films every part of which is successively exposed to the atmosphere and to growing bacterial cultures. This film action culture sludge processed by special aeration treatment so as to be furnished with abundance of oxygen and with masses of fertilized or active bacterial cultures which of themselves constitute good oxygen carriers, is constantly dispersed throughout the sewage liquid to meet the oxygen demand and to reach the suspended and colloidal particles in order to bring about flocculation, absorption and coagulation of the colloidal matter.

My improved method may be carried out by subjecting the sewage and sludge under treatment to new cycles of activity in respect of supplying or replenishing both the free dissolved oxygen and the oxygen carrying bacterial cultures. These cycles may take the form of successive zones of aeration, forced bacterial growth, activation, flocculation and sedimentation. The cycles of treatment may comprehend successive zones each of which consists of a sedimentation chamber and a culture-growth bed feeding thereinto along with the step of conveying activated sludge from its chamber and distributing the same over the culture-growth bed to bring about the film action of the activated culture-growth sludge processed by exposure to the atmosphere.

In this method of treatment, the lighter liquor flows from one zone of flocculation to another becoming more and more clear as it flows through the successive zones. The culture-growth beds play an important part in the treatment, not only in initiating new cycles of cell-growth, division and assimilation, but also in acting as oxygen carriers which are constantly being diffused throughout the mass of moving sewage. The activated sludge is, after a manner of speaking, kept built up so that its properties of absorbing and flocculating the suspended and colloidal particles are maintained in a state of high efficiency.

The foregoing and other objects and advantages of the invention will be better apparent from the following detailed description, and in this connection the principles of the invention in the present preferred practice and mode of carrying the same into effect in a practical way will be best understood by referring to the accompanying drawing, the views of which are more or less diagrammatical in character and in which:—

Figures 1, 2, 3:
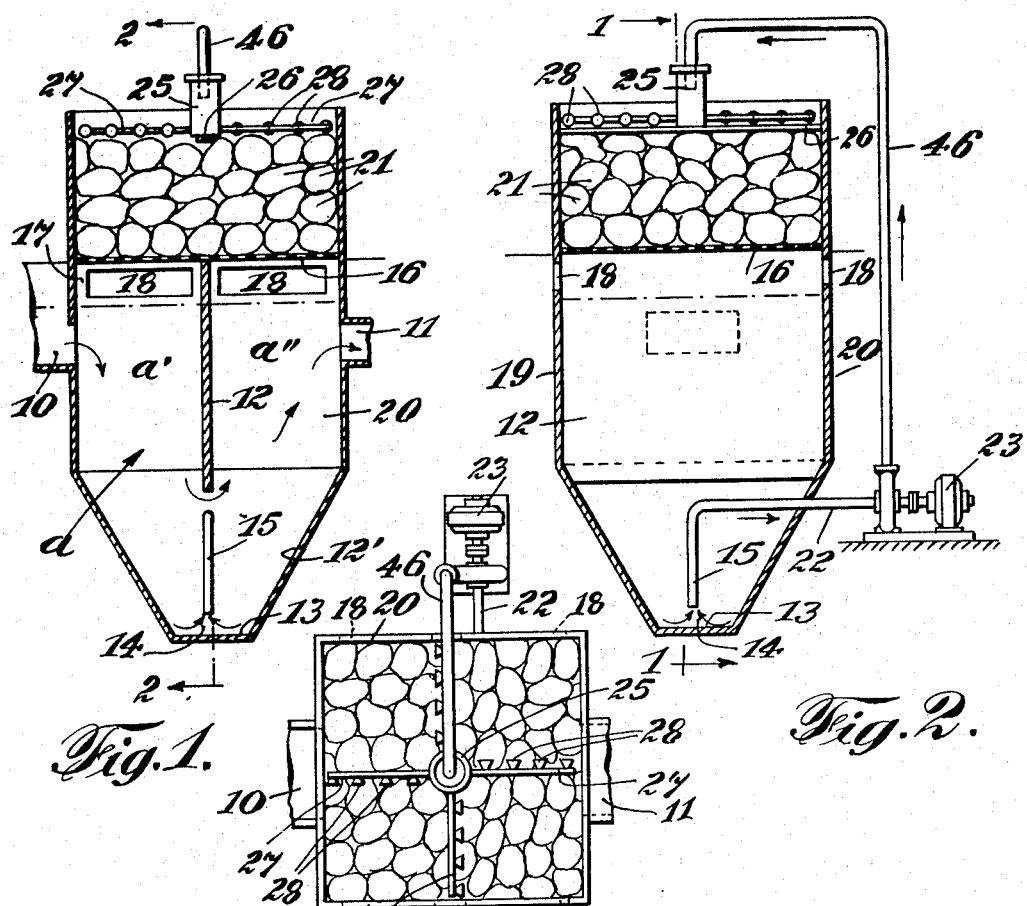
Fig. 1 is a vertical sectional view, showing a sedimentation chamber, a culture-growth bed and apparatus for conveying and distributing activated sludge over the culture-growth bed to bring about the film-flow action.
Fig. 2 represents another vertical sectional view through the sedimentation chamber, taken on the line 2—2 of Fig. 1.
Fig. 3 is a top plan view thereof.

Referring to the drawing and apropos to the detailed description, it is in place to mention that the supply of sewage fluid or waste, received from a municipality or community in a raw state, should be relieved of all trash, sticks, cans, grit, etc., before it is introduced through the inlet opening 10 into the sedimentation or clarification chamber $a$. The said trash and other wastes may be removed from the raw sewage liquid by any known or approved means or apparatus, as by a coarse mesh screen, grating, conveyor, trash collector device, or the like. The trash and wastes having been removed, the sewage liquid may, if desired, be furnished with materials to produce within the chamber $a$ a precipitate having coagulating properties for aiding sedimentation and clarification. Materials suitable for this purpose are disclosed in my United States Letters Patent No. 1,877,623, granted to me September 13, 1932, for Method for treating domestic sewage. While the treatment disclosed in said patent, or other preliminary treatment, is not essential to carrying out the treatment of the present application, the same may under certain conditions be used to advantage in connection with the present invention, the use of such preliminary treatment depending upon the character of the water content, the strength and quantity of the sewage solids, the quantity of sewage to be treated in a given time, and to other variables.

Irrespective of whether or not it is subjected to the mode of treatment aforesaid, the raw sewage fluid is introduced into the chamber $a$ in a colloidal or partially colloidal state, all trash having, of course, been previously removed. For the purpose of giving the sewage liquid a stream-flow, which may be gentle and slow or relatively rapid, according to conditions encountered, the chamber is provided with an outlet 11 and a vertical baffle wall 12 which divides the chamber into a downflow section $a'$ from the inlet 10 and an upflow section $a''$ to the outlet 11, the stream-flow of sewage passing below the lower edge of the baffle wall from the downflow section $a'$ to the upflow section $a''$. By means of sloping walls 12' which slope inwardly toward one another and downwardly toward the bottom 13, the lower portion of the chamber is narrowed downwardly to provide a sludge chamber 14 from which the sludge may be removed through a suction pipe 15 the open end of which may point toward the bottom 13.

The baffle wall 12 by preference extends upwardly to a horizontal screen 16 of a size equal to the entire cross sectional area of the chamber and which is disposed a spaced distance above the liquid level of sewage in the chamber in order to provide an air chamber 17 intervening between the liquid level and the screen. This air chamber is in open communication with the atmosphere through the provision of suitable relatively large apertures 18; and by referring to the drawing, it will be seen that an aperture 18 is provided at either side of the baffle wall 12 and both in the front and rear walls 19 and 20, respectively, of the tank structure. Provision is thus made for a free circulation of air in contact with the surface of the liquid in the chamber and for the flow of currents of air upwardly or downwardly through the screen and for additional purposes which will presently appear.

Located in the upper portion of the sedimentation chamber and upon the screen 16 is a culture-growth bed which may be composed of a mass of trap-rock 21 or other material suitable for the growth and development of bacterial cultures and cell-division. This trap-rock naturally affords numerous air gaps and crevices for the habitation and development of the cultures, provides for a downwardly film-flow action of activated sludge which may be distributed over and upon the trap-rock, and also provides for the oxidation of film-flowing sludge and the growing microscopic organisms, which are aerobic in action and constitute of themselves good oxygen carriers.

The rocks of the culture-growth bed are constantly filmed over by a supply of activated sludge which is taken from the sludge compartment 14 of the sedimentation chamber. The sludge suction pipe 15 is part of a withdrawal line 22 which extends through the rear wall of the structure to a suitable pump 23. A line 46 at the discharge side of the pump extends to a rotary sprinkler device comprising a hollow sprinkler 25 suitably mounted for rotation upon a cross piece 26 which is supported by the walls of the structure immediately above the trap-rock. The hollow cylinder 25 carries a plurality of radially extending pipes 27 each of which is equipped with a plurality of nozzles 28. It is to be noted that the nozzles of the pipes associated with the sprinkler are all pointed in the same direction so that the reaction caused by the sludge gushing from the nozzles will force the pipes backwards and give to the whole sprinkler a rotary motion. In this way, the motion of rotation is generated automatically from the force of the discharge produced by the pump. The sludge gushing from the nozzles is broken up in the atmosphere so as to absorb oxygen and this broken up sludge films over the rocks as it passes downwardly through the air gaps and crevices to provide nourishment for the growth and cell-division of the micro-organisms finding habitat therein. As the sludge filters downwardly over the rocks, it is constantly in contact with the currents of air passing through the air gaps and crevices so as to continue the absorption of oxygen. By the film-flow action of the sludge, masses of cultures are gathered thereby so as to be carried downwardly in the sludge through the crevices of the screen and thence through the open air chamber 17 in which contact with the atmosphere is continued. The sludge with the masses of micro-organisms, which of themselves are good oxygen carriers, as will be readily understood, finally falls into the sewage liquid moving through the sections $a'$, $a''$ for thorough diffusion therein.

By this process, dissolved oxygen in copious quantities is constantly being carried into the bulk of the flowing sewage whereby to effect digestion and absorption action and since under this process there is no exhaustion of the dissolved oxygen supply, there is no danger of producing putrefactive products.

With the flowing sewage liquid receiving in each of the sections $a'$, $a''$, fresh supplies of dissolved oxygen, re-oxidized sludge and immense numbers of fresh bacterial cultures, practically all of the colloids will undergo chemical changes to assist or hasten absorption action, flocculation, coagulation and sedimentation. The sewage and sludge are constantly in contact with dissolved oxygen, and, therefore, in constant activation with fresh additions of bacterial cultures acting as a ferment for accelerating desired chemical changes naturally effected by meeting the oxygen demand of the sewage. The culture bed plays an important part in this, not only in initiating new cycles of cell growth, division and assimilation, but also in acting as oxygen carriers which are constantly being diffused through the bulk of the sewage.

In its film-flow over the rocks and through the numerous crevices, the activated sludge is, of course, agitated so that every part thereof is successively exposed to films and currents of air as in the natural purification which occurs in a stream. In thus filming over the rocks, the activated sludge becomes rapidly saturated with oxygen and the bacterial cultures gathered in the sludge are kept in continuous contact with the oxygen for their growth and to continue their functioning. The process which takes place in the culture-growth bed is essentially one of progressively mixing thin films of activated sludge, atmospheric air and biological cultures to produce an oxygen saturated conglomerate. The trap-rock is of course more or less porous, its pores affording innumerable interstices in which the sludge film and bacterial growths collect for detention periods, and the mass of rocks provide numerous sinuous passages and crevices for bacterial growth while at the same time affording passages for moving films of activated sludge and atmospheric air. The activated sludge in filming or trickling downward from rock to rock is of course agitated or broken up so that every part thereof is successively exposed to the air for saturation with oxygen. A most favorable medium is thus provided for initiating and maintaining continuous multiplication by growth and cell-division of masses of bacteria of undiminished vitality. These bacteria in immense numbers are gathered in the film-flow action of the oxygen saturated sludge in which, of itself, there is constantly going on the initiation of new cycles of assimilation, growth and cell-division. As this sludge with its growing bacterial cultures drains and drips through the screen and thence through the open air chamber below the screen, every part continues to be brought into contact with the oxygen. Re-aeration or the absorption of the oxygen from the air is continuous from the time the activated sludge gushes from the nozzles. The oxygen thus absorbed by the sludge and micro-organisms is carried into the flow of sewage in sections $a'$ and $a''$ and thoroughly diffused through the body or bulk of this stream-flow to bring about absorption and flocculation. The activated sludge is, after a manner of speaking, kept built up so that its properties of absorbing and flocculating the suspended and colloidal solids are maintained in a state of high efficiency. The lighter and clearer liquor, after being relieved of suspended and colloidal matter which settles into the sludge chamber for withdrawal, passes in the stream-flow to the discharge outlet 11. A strong sewage has, of course, a higher oxygen demand than weak sewage and therefore requires a longer absorption action. To meet this situation, it will be recognized that the rate of the sewage flow through the sedimentation chamber and as well the rate of distributing the activated sludge over the rocks, may be regulated.

It will be recognized by those familiar with this art that in the use of my process and in accordance with the principles herein disclosed, there will be a constant biological flocculation of the suspended and colloidal substances contained in the sewage moving through the sedimentation chamber, it of course being well known that when suspended and colloidal solids are kept in contact and in motion with an abundance of oxygen, the sewage assumes a flocculent appearance. The bacterial cultures grown in the culture-growth bed and diffused through the sewage, gather and grow in the flocculi in great numbers, so that a flocculation process as well as an oxidation process is always under way. The drain and drip of the conglomerate from the culture-growth bed takes place over the whole area of the flow of sewage in the sedimentation chamber so that downward diffusion of the conglomerate will reach every part of the moving sewage and exercise a downward sweeping action or blanketing effect upon the suspended matter and colloids to intermix therewith. In this process the colloidal particles are constantly growing by accretion of the conglomerate diffused therethrough to effect absorption and flocculation, and there is also taking place a constant gathering and growth of the bacteria in the flocculi. By constantly meeting the oxygen demand and constantly maintaining the absorption action, the activated sludge will remove practically all of the colloids from the sewage.

Figure 4:
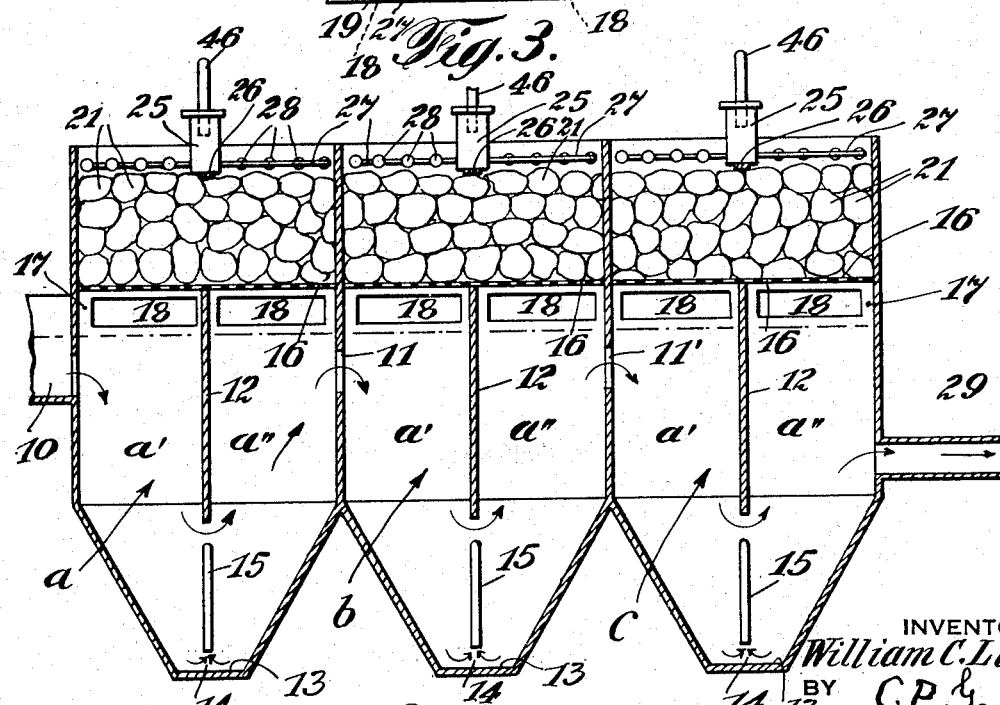
Fig. 4 is a vertical sectional view showing a succession of zones or cycles of treatment for a stream-flow of sewage.

The flow of sewage liquid may be subjected to successive zones or stages of treatment, as will be appreciated from an inspection of Fig. 4 in which I have illustrated the sedimentation chambers $b$ and $c$ added in succession to the chamber $a$, each having a baffle wall 12 dividing it into sections $a'$, $a''$, a trap-rock bed 21 disposed on a screen 16 spaced above the liquid level to provide an air chamber 17, and also having a rotary sprayer device 25 for distributing activated sludge over the trap-rock, the activated sludge being pumped from a sludge compartment 14 to the sprayer device.

The sewage liquid flows from the upflow side of chamber $a$ through the outlet 11 to the downflow side of chamber $b$, and then through the upflow side of chamber $b$ through the opening 11' to the downflow side of chamber $c$, finally being discharged through the outlet 29 from the upflow side of chamber $c$. In this multiple zone or stage mode of treatment, the flowing sewage liquid receives in each of the sedimentation chambers and more particularly in each of the sections $a'$, $a''$ thereof fresh supplies of dissolved oxygen, re-aerated sludge and masses of fresh bacterial cultures. This multiple zone or stage mode of treatment may be added to and made as extensive as desired or as may be necessary in order to remove all of the colloids and obtain a clear effluent liquor discharging from the outlet 29.

In this multiple zone mode of treatment, the lighter liquor passes in the stream-flow from one zone of flocculation to another, becoming as it flows from zone to zone, more and more clear. Throughout the multiple zones, the bacterial cultures are kept in continuous contact with atmospheric or dissolved oxygen, so that the oxygen demand is continuously satisfied through absorption due to diffusion of the activated sludge particles which are intimately and frequently intermingled with colloidal particles to furnish flocculation and complete coagulation. In connection with this multiple zone mode of treatment, I may at any time or continuously introduce into any one or even all of the sedimentation chambers any materials or ingredients having coagulating properties for aiding or hastening sedimentation.

Important advantages of this method are to be found in its simplicity and flexibility, and in the ease and rapidity with which the oxygen demand of the sewage is constantly met, while at the same time the activated sludge is constantly built up and diffused so that every part of the moving sewage is rapidly invaded by micro-organisms which protect it from putrefaction. The continuous absorption action accompanied by the downward sweep or blanketing effect aids and hastens flocculation, coagulation and clarification.

Other modes of applying the principles of my invention may be employed, instead of the selected ones which have been given herein for clearness of understanding only. The sedimentation or clarification chambers may be of any known or approved type or variety forming part of a sewage treatment or conditioning system, and the treatments carried through by the culture-growth beds may be practiced independently of sedimentation or clarification chambers and in conjunction with any known or approved method of conditioning raw sewage.

It will be recognized that many apparently widely different embodiments of the invention could be made without departing from the principles of the invention or from the scope thereof, and it is intended that all matter contained in the above description or illustrated in the accompanying drawing shall be interpreted as illustrative and not in a limiting sense. The terms and expressions which I have employed are used as terms of description and not of limitation, and I have no intention, in the use of such terms and expressions, of excluding any equivalents of the methods shown and described or portions thereof, but recognize that various modifications are possible within the scope of the invention claimed.

I claim:—

1. The method of continuously flocculating and settling out colloidal matter from a stream-flow of sewage, the steps of trickling activated sludge so as to expose the same for the absorption of atmospheric air and to promote bacterial growth and cell division, continuously trickling such aerated sludge with accumulated growing bacteria into the stream of sewage for diffusion throughout the same to maintain increased bacterial action for flocculation, coagulation and sedimentation, and progressively removing activated sludge from the stream of sewage and employing the same as the supply for carrying through the trickling activated sludge process.

2. The method of treating sewage which comprises depositing solids from a moving stream thereof in the form of a sludge, removing said sludge and trickling portions of it in the form of films over aerated surfaces inoculated with aerobic bacteria for the absorption of oxygen and the development of increased amounts of bacteria therein, and reintroducing the resulting activated sludge with its accumulated growing bacteria uniformly over the surface of the sewage liquid in such a manner that it forms a descending sludge blanket that settles downwardly through the sewage liquid and flocculates colloidal matter therein without requiring the addition of air.

3. In the art of treating sewage the steps which comprise subjecting sewage to a flocculating process without blowing air therethrough, whereby sludge is formed, removing the sludge from the sewage and causing it to trickle in the form of thin film over an extended film habitat made up of a webwork of passages and crevices for the growth of bacterial cultures in the presence of air to produce an oxygen saturated conglomerate and progressively diffusing the conglomerate through the body of sewage in order to flocculate the latter.

4. A method of treating sewage which comprises introducing sewage into a settling zone where the sewage is separated into sludge and effluent without introduction of air into the sewage, removing the sludge and pumping at least a portion of the sludge to a point above the sewage treatment zone, causing the sludge to trickle downwardly over an extended stationary surface in contact with atmospheric air whereby cultures of aerobic bacteria are built up on the said surfaces and the sludge in trickling thereover is aerated and activated and causing the sludge dropping off from the bottom of said surfaces to drop onto the sewage in the treatment zone and to sink therethrough in order to supply oxygen and bacterial treatment to said sewage and to promote flocculation and sludge formation by the sweeping action of the sludge flocculi sinking through the sewage.

WILLIAM C. LAUGHLIN.